(12) United States Patent
Ogasawara

(10) Patent No.: US 8,094,327 B2
(45) Date of Patent: Jan. 10, 2012

(54) IMAGE PROCESSING DEVICE, IMAGE PROCESSING METHOD, COMPUTER READABLE RECORDING MEDIUM STORED WITH IMAGE PROCESSING PROGRAM, IMAGE PROCESSING SYSTEM, AND IMAGE FORMING DEVICE

(75) Inventor: Kenji Ogasawara, Kawaguchi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1043 days.

(21) Appl. No.: 11/163,697

(22) Filed: Oct. 27, 2005

(65) Prior Publication Data
US 2006/0192982 A1  Aug. 31, 2006

(30) Foreign Application Priority Data
Feb. 28, 2005 (JP) ................................ 2005-054710

(51) Int. Cl.
G06F 3/12 (2006.01)
G06F 15/00 (2006.01)
H04N 1/00 (2006.01)
H04N 1/40 (2006.01)
G06K 9/36 (2006.01)
G06K 9/20 (2006.01)
G06K 9/54 (2006.01)

(52) U.S. Cl. .. 358/1.14; 358/1.1; 358/1.15; 358/426.05; 358/448; 382/276; 382/282; 382/284; 382/304

(58) Field of Classification Search ................ 358/1.18, 358/1.15, 1.2, 1.16, 426.05, 448, 1.1, 3.23, 358/501, 540, 450, 352; 725/911, 507; 707/527, 707/295, 511; 382/276, 282, 284, 307, 304; 345/352
See application file for complete search history.

(56) References Cited

U.S. PATENT DOCUMENTS

| | | | | |
|---|---|---|---|---|
| 6,111,657 A * | 8/2000 | Muto et al. | ..................... | 358/1.2 |
| 6,488,423 B1 * | 12/2002 | Komine | ......................... | 400/70 |
| 6,606,669 B1 * | 8/2003 | Nakagiri | ...................... | 719/327 |
| 6,625,406 B2 * | 9/2003 | Suzuki et al. | ................... | 399/75 |
| 2001/0043723 A1 * | 11/2001 | Kadota et al. | ................. | 382/113 |
| 2001/0048533 A1 * | 12/2001 | Koana | ......................... | 358/1.15 |
| 2002/0051194 A1 * | 5/2002 | Sakura | ......................... | 358/1.15 |
| 2003/0107764 A1 * | 6/2003 | Takei | ............................ | 358/1.15 |
| 2005/0094191 A1 * | 5/2005 | Vondran et al. | ............. | 358/1.15 |

(Continued)

FOREIGN PATENT DOCUMENTS

JP  2000-155654  6/2000

(Continued)

OTHER PUBLICATIONS

Translation of Official Notice of Reason for Refusal for JP-A-2005-054710.

(Continued)

*Primary Examiner* — Benny Tieu
*Assistant Examiner* — Ngon Nguyen
(74) *Attorney, Agent, or Firm* — Buchanan Ingersoll & Rooney PC

(57) ABSTRACT

An image processing device manages data for each object transmitted for each image forming device with respect to a plurality of image forming devices, which are transmission destinations of data for each object, and controls transmission of data for each object which has not been transmitted to each image forming device based on the management contents.

21 Claims, 20 Drawing Sheets

U.S. PATENT DOCUMENTS

2010/0195154 A1   8/2010   Izaki et al.

FOREIGN PATENT DOCUMENTS

| JP | 2001-344083 | 12/2001 |
| JP | A-2002-342039 | 11/2002 |
| JP | A-2003-200622 | 7/2003 |
| JP | 2004-074499 | 3/2004 |
| JP | 2004-192390 | 7/2004 |
| JP | A-2004-310259 | 11/2004 |

OTHER PUBLICATIONS

Notification of Reason for Refusal issued in the corresponding Japanese Patent Application No. 2008-004780 dated Jan. 26, 2010, and an English Translation thereof.

Notification of Reason for Refusal issued in the corresponding Japanese Patent Application No. 2008-004780 dated Sep. 27, 2010 and an English language translation thereof.

* cited by examiner

| OBJECT NUMBER | | OBJ1 | OBJ2 | OBJ3 | OBJ4 | OBJ5 | OBJ6 | OBJ7 | OBJ8 | OBJ9 | OBJ10 |
|---|---|---|---|---|---|---|---|---|---|---|---|
| ITEM | | SENDER | ADDRESS | NAME | UserNo | WALL-PAPER | GREETING | DESCRIPTION 1 | IMAGE 1 | DESCRIPTION 2 | IMAGE 2 |
| TYPE | | REUSE | TEMPORARY | TEMPORARY | REUSE | REUSE | REUSE | REUSE | REUSE | REUSE | REUSE |
| INPUT PAGE DATA | D1 | myadrs | adres1 | name1 | uno101 | back | | | | | |
| | D2 | | | | uno101 | back | mesage1 | m_col1 | pic_col1 | m_col2 | pic_col2 |
| | D3 | myadrs | adres3 | name3 | uno205 | back | mesage1 | | | | |
| | D4 | | | | uno205 | back | | m_col2 | pic_col2 | m_bw1 | pic_bw1 |
| | D5 | myadrs | adres5 | name5 | uno326 | back | mesage1 | | | | |
| | D6 | | | | uno326 | back | | m_col1 | pic_col1 | | |

| | | REUSABLE OBJECT | | TEMPORARY OBJECT |
|---|---|---|---|---|
| | | ID | TRANSMISSION STATUS | ID |
| DESTINATION | PRINTER 1 | myadrs | TRANSMITTED | adres1 |
| | | back | TRANSMITTED | adres3 |
| | | uno101 | TRANSMITTED | adres5 |
| | | uno205 | NOT TRANSMITTED | name1 |
| | | uno326 | NOT TRANSMITTED | name3 |
| | | | | name5 |
| | PRINTER 2 | back | TRANSMITTED | |
| | | mesage1 | TRANSMITTED | |
| | | m_col1 | TRANSMITTED | |
| | | pic_col1 | TRANSMITTED | |
| | | m_col2 | TRANSMITTED | |
| | | pic_col2 | TRANSMITTED | |
| | | m_bw1 | NOT TRANSMITTED | |
| | | pic_bw1 | NOT TRANSMITTED | |
| | | uno101 | TRANSMITTED | |
| | | uno205 | NOT TRANSMITTED | |
| | | uno326 | NOT TRANSMITTED | |

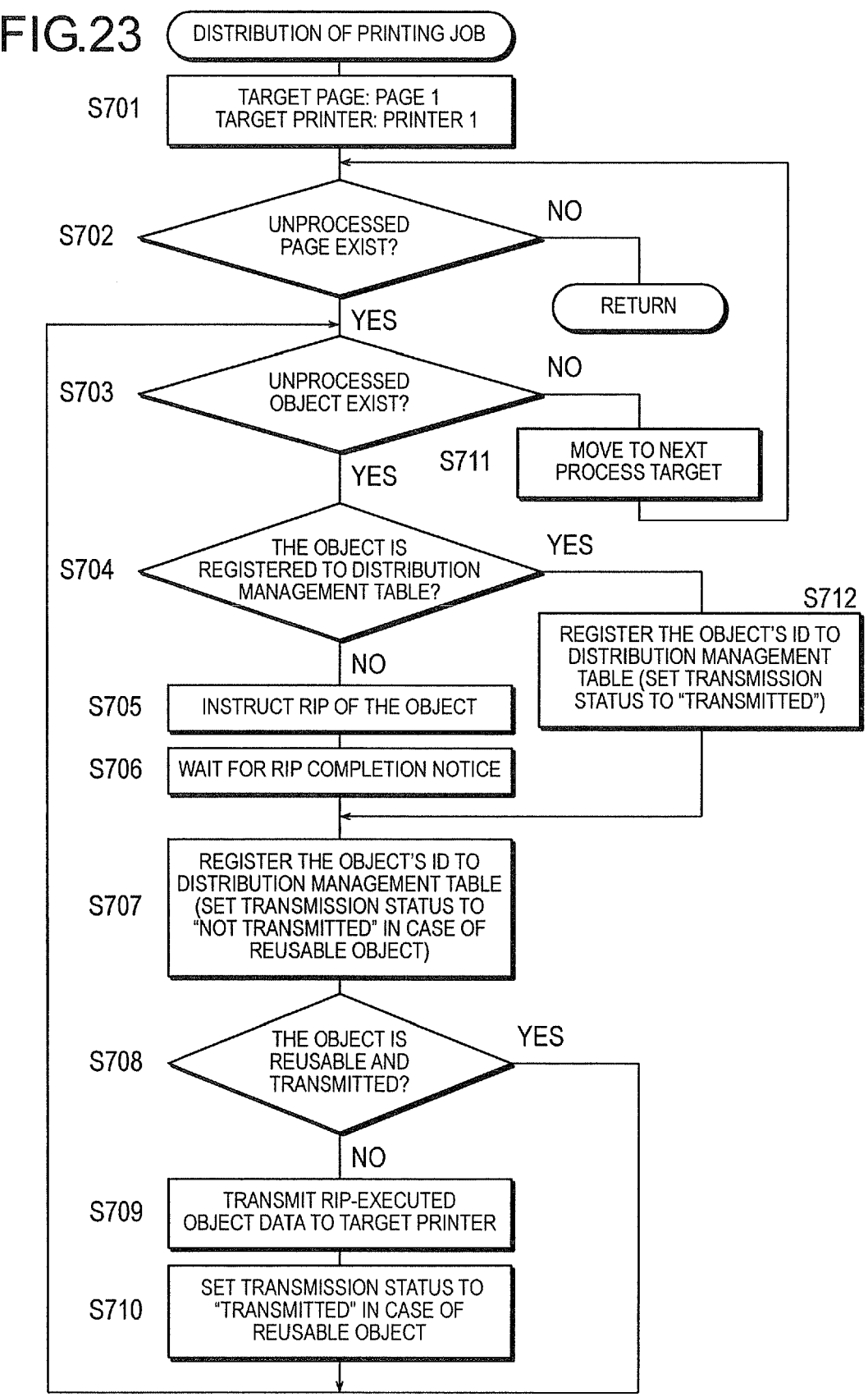

| OBJECT NUMBER | OBJ1 | OBJ2 | OBJ3 | OBJ4 | OBJ5 | OBJ6 | OBJ7 | OBJ8 | OBJ9 | OBJ10 |
|---|---|---|---|---|---|---|---|---|---|---|
| ITEM | SENDER | ADDRESS | NAME | UserNo | WALL-PAPER | GREETING | DESCRIPTION 1 | IMAGE 1 | DESCRIPTION 2 | IMAGE 2 |
| TYPE | REUSE | TEMPO-RARY | TEMPO-RARY | REUSE | REUSE | REUSE | REUSE | REUSE | REUSE | REUSE |
| DESTINATION | | | | PRINTER 1 | PRINTER 1 | | | | | |
| D1 | myadrs | adres1 | name1 | uno101 | back | mesage1 | m_col1 | pic_col1 | | |
| D2 | | | | uno101 | back | mesage1 | m_col2 | pic_col2 | m_col2 | pic_col2 |
| D3 | myadrs | adres3 | name3 | uno205 | back | mesage1 | m_col2 | pic_col2 | m_bw1 | pic_bw1 |
| D4 | | | | uno205 | back | mesage1 | m_col1 | pic_col1 | | |
| D5 | myadrs | adres5 | name5 | uno326 | back | | | | | |
| D6 | | | | uno326 | back | | | | | |

INPUT PAGE DATA

IMAGE PROCESSING DEVICE, IMAGE PROCESSING METHOD, COMPUTER READABLE RECORDING MEDIUM STORED WITH IMAGE PROCESSING PROGRAM, IMAGE PROCESSING SYSTEM, AND IMAGE FORMING DEVICE

This application is based on Japanese Patent Application No. 2005-054710 filed on Feb. 28, 2005, the contents of which are hereby incorporated by reference.

BACKGROUND OF THE INVENTION

1. Field of the Invention

The invention relates to an image processing device, an image processing method, a computer readable recording medium stored with an image processing program, an image processing system, and an image forming device. The invention relates to an image processing device, an image processing method, a computer readable recording medium stored with an image processing program, an image processing system, and an image forming device used particularly for processing a file containing objects for specifying pages, at least one of which objects being used in a plurality of locations in the file, and transmitting data for each object in parallel to a plurality of image forming devices.

2. Description of the Related Art

In recent years, the need for the variable printing has been increasing for mass printing represented by direct mail from the standpoint of CRM (Customer Relationship Management). Variable printing here means the printing method in which the output contents of each page can be partially changed depending on the needs. Therefore, offset printing is not suitable as it is a mass printing method based on a certain fixed data.

Also, printing with a printer using a PDL (page description language) such as PCL (Printer Control Language) had a practical problem such that it takes a lot of time for process in order to do mass printing as it takes a substantial time for rasterizing process (RIP: Raster Image Processing) for converting a PDL file into bitmap format image data. In order to solve this problem, a data processing device is proposed in which, if a similar kind of objects are found in the data of an intermediate page description language, the page data is prepared by registering such objects after adding identification information and applying RIP to the objects and reusing the objects that have been treated by RIP (refer to Unexamined Publication No. JP-A-2004-192390).

On the other hand, since the variable printing by a single printer is limited in the printing speed compared to the offset printing, it is preferable to use the cluster printing method that uses a plurality of printers in parallel to increase the processing speed.

However, the data processing device described in said Unexamined Publication is nothing but a device for preparing page data by itself judging whether the objects treated by RIP can be reused or not. In other words, said Unexamined Publication does not disclose at all any technology for printing by synthesizing the objects while managing necessary objects including reusable objects for each of the plurality of printers. In other words, the technology described in said Unexamined Publication does not provide a method for executing the variable printing at a high speed using a plurality of printers.

OBJECTS AND SUMMARY

It is an object of the present invention to provide an image processing device, an image processing method, a computer readable recording medium stored with an image processing program, an image processing system, and an image forming device, which are improved to solve the abovementioned problems.

It is another object of the present invention to process a file containing objects for specifying pages, at least one of which objects being used in a plurality of locations in the file, and print the file at a high speed using a plurality of image forming devices.

According to an embodiment of the invention, there is provided an image processing device for processing a file containing objects that define a part or all of contents of a specific page, at least one of which objects is used in a plurality of locations in the file, and transmitting data for each object in parallel to a plurality of image forming devices, comprising: a first management unit for managing data that has been transmitted to a first image forming device; a second management unit for managing data that has been transmitted to a second image forming device; and a transmission control unit for controlling transmission of data that has not been transmitted to said first image forming device based on said first management unit's management contents and transmission of data that has not been transmitted to said second image forming device based on said second management unit's management contents.

According to this invention, only the data necessary for printing at each image forming device among the data of each object obtained by processing the file, no more or no less, is transmitted to each image forming device. This makes it possible to improve the processing speed as a whole by minimizing the data transmission time to the image forming device as it prevents wasteful data transmission.

Therefore, it makes it possible to process a file containing objects for specifying pages, at least one of which objects being used in a plurality of locations in the file, and print the file at a high speed using a plurality of image forming devices.

According to another embodiment of the invention, there is provided an image processing method for processing a file containing objects that define a part or all of contents of a specific page, at least one of which objects is used in a plurality of locations in the file, and transmitting data for each object in parallel to a plurality of image forming devices, comprising the steps of: 1) managing data that has been transmitted to a first image forming device; 2) managing data that has been transmitted to a second image forming device; and 3) controlling transmission of data that has not been transmitted to said first image forming device based on management contents in the step 1) and transmission of data that has not been transmitted to said second image forming device based on management contents in the step 2).

According to a further embodiment of the invention, there is provided a computer readable recording medium stored with an image processing program for controlling an image processing device for processing a file containing objects that define a part or all of contents of a specific page, at least one of which objects is used in a plurality of locations in the file, and transmitting data for each object in parallel to a plurality of image forming devices, said image processing program causing the image processing device to execute a process comprising the steps of: 1) managing data that has been transmitted to a first image forming device; 2) managing data that has been transmitted to a second image forming device; and 3) controlling transmission of data that has not been transmitted to said first image forming device based on management contents in the step 1) and transmission of data that has not been transmitted to said second image forming device based on management contents in the step 2).

According to a further aspect of the invention, there is provided an image processing system, comprising: a first image forming device; a second image forming device; and an image processing device for processing a file containing objects that define a part or all of contents of a specific page, at least one of which objects is used in a plurality of locations in the file, and transmitting data for each object in parallel to a first image forming device and a second image forming device; said image processing device including: a management information preparation unit for preparing management information concerning common data to be used in common in the first image forming device and the second image forming device; a first management unit for managing data that has been transmitted to the first image forming device; a second management unit for managing data that has been transmitted to the second image forming device; and a transmission control unit for controlling transmission of data that has not been transmitted to said first image forming device based on said first management unit's management contents as well as said management information, and transmission of data that has not been transmitted to said second image forming device based on said second management unit's management contents; said second management unit managing common data indicated in said management information as already transmitted; said first image forming device including: a transmission unit for transmitting common data indicated in the management information received from said image processing device to said second image forming device; and a printing unit for printing based on the data received from said image processing device; said second image forming device including: a printing unit for printing based on the data received from said image processing device and said first image forming device.

According to a still further embodiment of the invention, there is provided an image processing device used in an image processing system having a first image forming device, a second image forming device, and an image processing device for processing a file containing objects that define a part or all of contents of a specific page, at least one of which objects is used in a plurality of locations in the file, and transmitting data for each object in parallel to the first image forming device and the second image forming device, comprising: a management information preparation unit for preparing management information concerning common data to be used in common in the first image forming device and the second image forming device; a first management unit for managing data that has been transmitted to the first image forming device; a second management unit for managing data that has been transmitted to the second image forming device; and a transmission control unit for controlling transmission of data that has not been transmitted to said first image forming device based on said first management unit's management contents as well as said management information used for transmitting common data indicated in said management information, and transmission of data that has not been transmitted to said second image forming device based on said second management unit's management contents; said second management unit managing common data indicated in said management information as already transmitted.

According to a yet further embodiment of the invention, there is provided an image forming device used in an image processing system having a plurality of image forming devices, and an image processing device for processing a file containing objects that define a part or all of content of a specific page, at least one of which objects is used in a plurality of locations in the file, and transmitting data for each object in parallel to the plurality of image forming devices, comprising: a transmission unit for transmitting, when management information concerning common data used commonly in the plurality of image forming devices is received from said image processing device, common data indicated in the received management information to another image forming device; and a printing unit for printing based on the data received from said image processing device and/or another image forming device.

The objects, characteristics and properties of this invention other than those set forth above will become apparent from the description given herein below with reference to preferred embodiments illustrated in the accompanying drawings.

BRIEF DESCRIPTION OF THE DRAWINGS

FIG. 17 is a diagram showing an example object management table.

FIG. 18 is a diagram showing an example distribution management table.

FIG. 23 is a flowchart showing the sequence of the printing job distribution process according to the second embodiment.

FIG. 24 is an example object management table prepared in the second embodiment.

DETAILED DESCRIPTION OF PREFERRED EMBODIMENTS

The embodiment of this invention will be described below with reference to the accompanying drawings.

Figure 1:
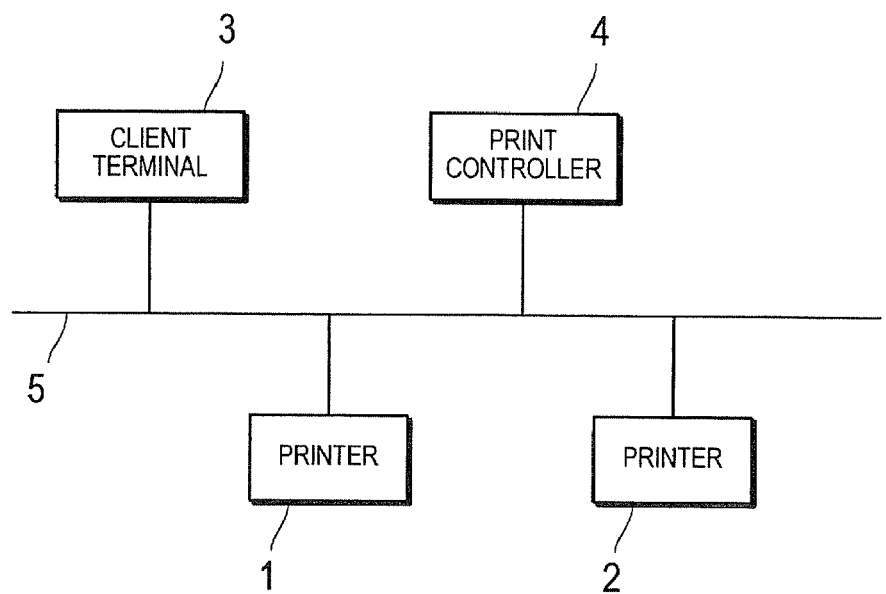
FIG. 1 is an overall constitutional diagram of an image processing system according to a first embodiment of the invention.

FIG. 1 is an overall constitutional diagram of an image processing system according to a first embodiment of the invention.

The image processing system is equipped with two printers 1 and 2, a client terminal 3, and a printer controller 4, all of which are interconnected with each other via a network 5. The network 5 can be a LAN connecting computers and network equipment according to standards such as Ethernet(r), Token Ring, and FDDI, or a WAN that consists of several LANs connected by a dedicated line.

The client terminal 3 prepares a printing job including an object containing a part or all of the contents of a specific page and transmits it to the printer controller 4. The printer controller 4 executes RIP based on the received printing job, and transmits data for each object (hereinafter called "object data") which is already treated by RIP to each of the printers 1 and 2. The printers 1 and 2 prepare the page data by synthesizing the received RIP-executed object data and execute the printing for the page data.

Although the printer controller 4 and the printers 1 and 2 are connected via the network 5 in this embodiment, the present invention is not limited to it and can be connected via a dedicated interface bus such as IEEE 1394 serial bus.

Moreover, the types and the number of equipment to be connected to network 5 are not limited to those shown in FIG. 1. Although two printers are connected in this embodiment, the number of printers is not limited to two but can be three or more.

Next, constitution of each device mentioned above will be described below, but the description of a function common to multiple devices will be made only once when it first appears and will not be repeated afterwards in order to avoid duplicate descriptions.

Figure 2:
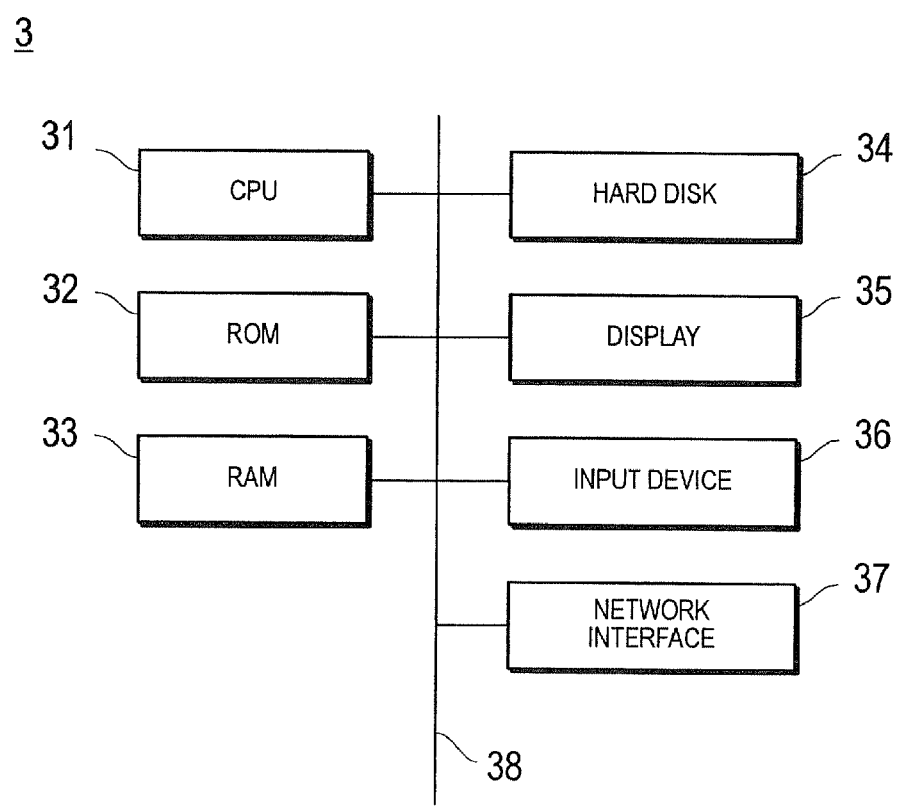
FIG. 2 is a block diagram showing a schematic constitution of a client terminal.

FIG. 2 is a block diagram showing a schematic constitution of the client terminal 3. The client terminal 3 is typically a normal personal computer.

The client terminal 3 contains a CPU 31, a ROM 32, a RAM 33, a hard disk 34, a display 35, an input device 36, and a network interface 37, all of which are interconnected via a bus 38 for exchanging signals.

The CPU 31 controls various parts indicated above and executes various arithmetic processes according to a program. The ROM 32 stores various programs and data in advance. The RAM 33 stores programs and data temporarily as a working area. The hard disk 34 stores various programs including an operating system and data.

Display 35 is typically a liquid crystal display and displays various kinds of information. The input device 36 consists of a pointing device such as a mouse, a keyboard, and others, and is used for making various kinds of inputs. The network interface 37 is typically a LAN card and is used for communicating with external equipment via a network 5.

The hard disk 34 stores a printer driver. The printing job is prepared by such a printer driver based on the data consisting of characters and images received from an application.

Figure 3:
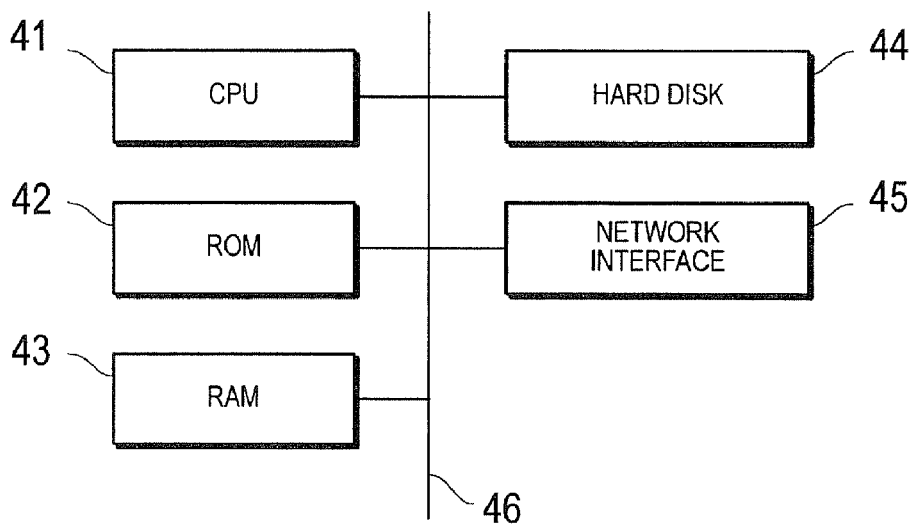
FIG. 3 is a block diagram showing a schematic constitution of a printer controller.

FIG. 3 is a block diagram showing a schematic constitution of the printer controller 4.

The printer controller 4 contains a CPU 41, a ROM 42, a RAM 43, a hard disk 44, and a network interface 45, all of which are interconnected via a bus 46 for exchanging signals.

Figure 4:
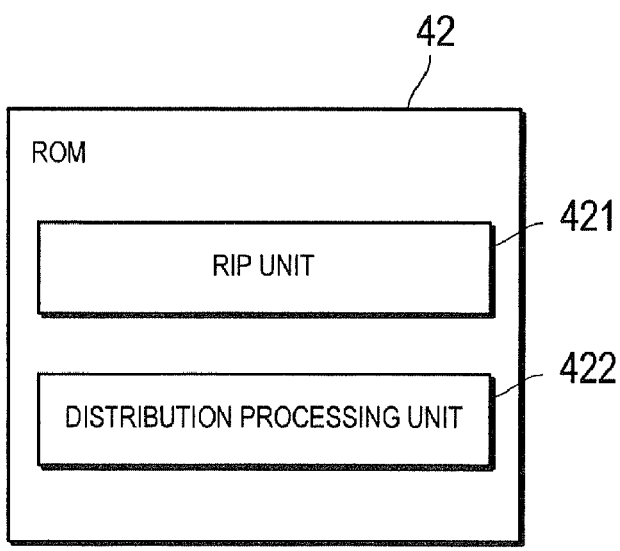
FIG. 4 is a diagram for describing a RIP unit and a distribution process unit.

As shown in FIG. 4, the ROM 42 provides specific areas for storing a program that corresponds to a RIP unit 421 and a distribution process unit 422 for their exclusive uses respectively. The RIP unit 421 executed RIP based on the printing job received from the client terminal 3. In other words, the RIP unit 421 converts the object data contained in the received printing job into image data of the bit map format that is used by the printers 1 and 2 for printing. The distribution process unit 422 transmits the RIP-executed object data distributed to the printers 1 and 2 respectively in parallel. The functions of the RIP unit 421 and the distribution process unit 422 are implemented as the CPU 41 executes their respective programs.

Figure 5:
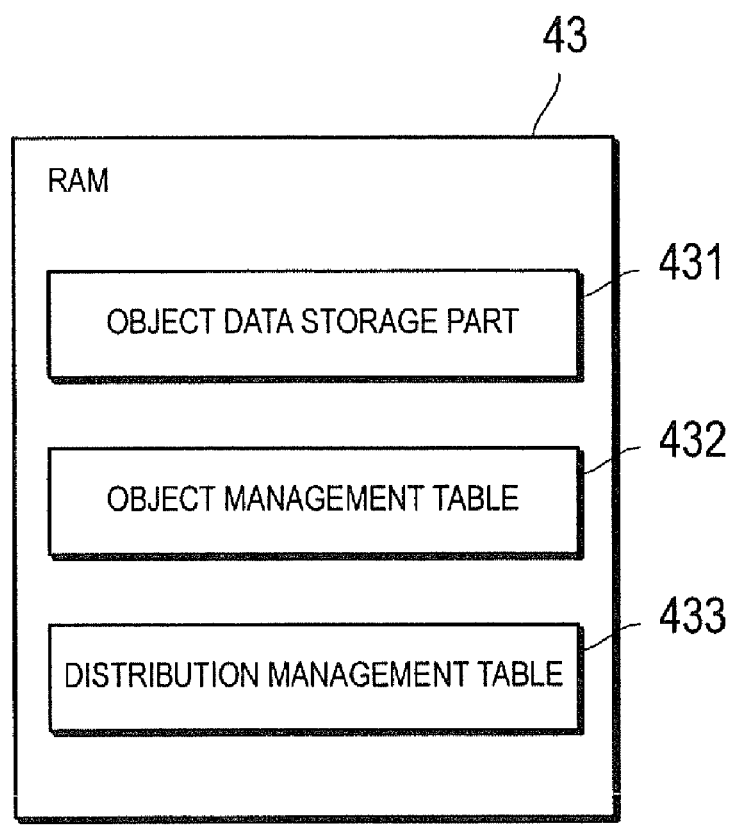
FIG. 5 is a diagram for describing an object data storage part, an object management table, and a distribution management table.

As shown in FIG. 5, the RAM 43 provides specific areas for an object data storage part 431, an object management table 432, and a distribution management table 433 for their exclusive uses respectively. The object data storage part 431 stores object data contained in the received printing job. The object management table 432 is a table for managing the objects that constitute each page. The distribution management table 433 is a table for managing the identification name of the object to be transmitted and the transmission condition of said object for each printer. The details of the object management table 432 and the distribution management table 433 will be described later.

Figure 6:
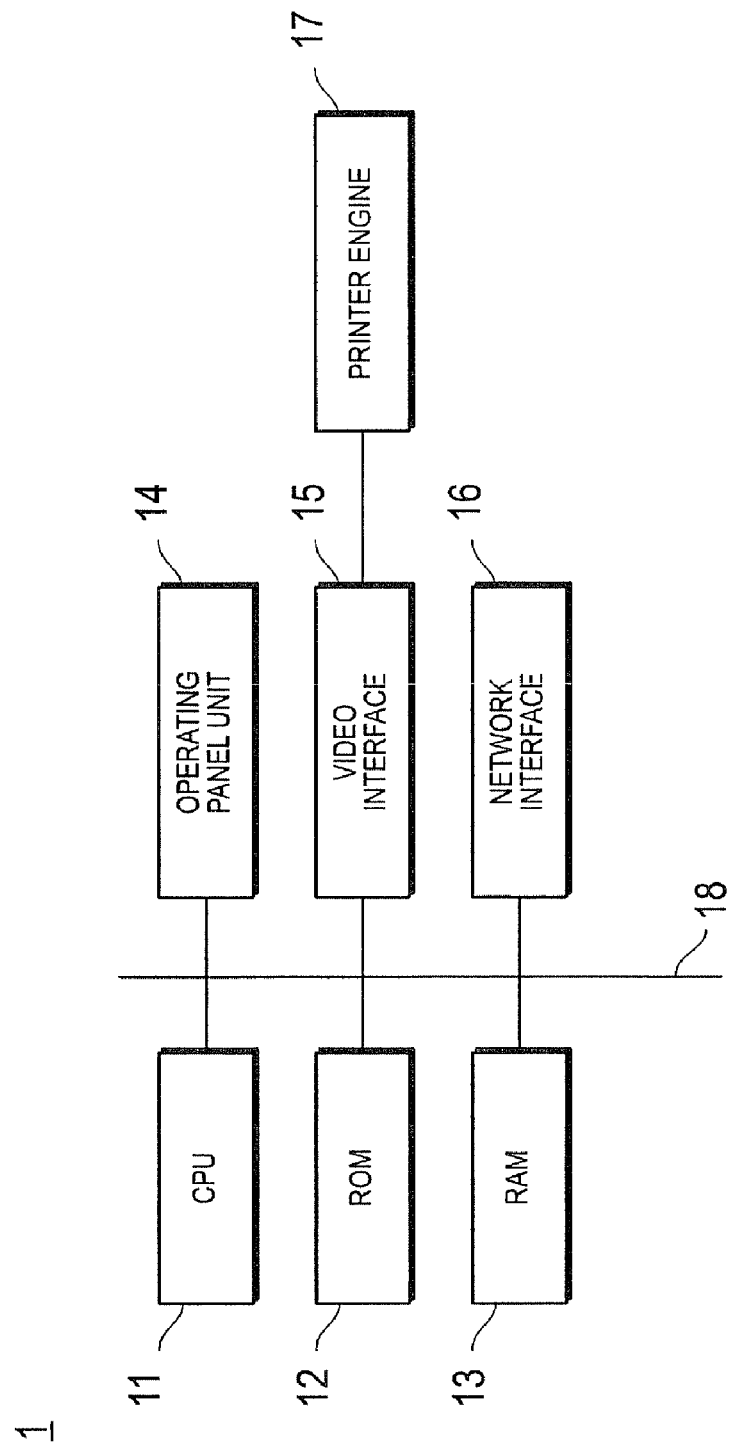
FIG. 6 is a block diagram showing a schematic constitution of a printer.

FIG. 6 is a block diagram showing a schematic constitution of a printer 1. Since the printer 2 has a similar constitution as the printer 1, its description is omitted.

The printer 1 has a CPU 11, a ROM 12, a RAM 13, an operating panel unit 14, a video interface 15, and a network interface 16, all of which are interconnected with each other via a bus 18 for exchanging signals. The printer 1 has a printer engine 17 connected to the video interface 15.

Figure 7:
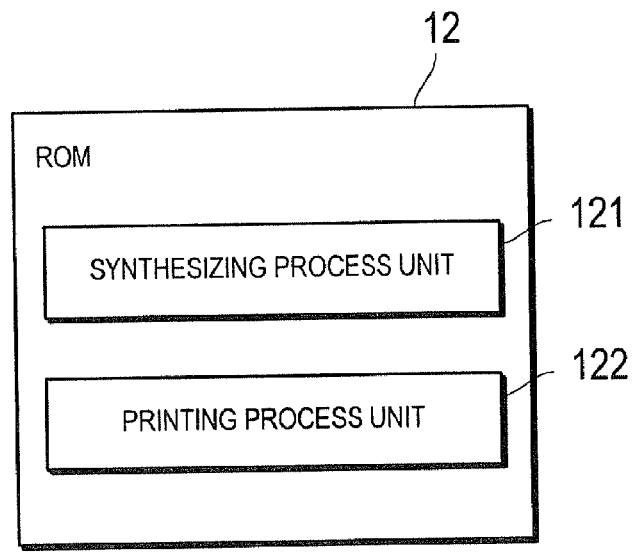
FIG. 7 is a diagram for describing a synthesizing process unit and a printing process unit.

As shown in FIG. 7, the ROM 12 provides specific areas for storing a program that corresponds to a synthesizing process unit 121 and a printing process unit 122 for their exclusive uses respectively. The synthesizing process unit 121 prepares page data by synthesizing the received RIP-executed object data for each page. The printing process unit 122 instructs the execution of printing for the prepared page data. The functions of the synthesizing process unit 121 and the printing process unit 122 are implemented as the CPU 11 executes their respective programs.

Figure 8:
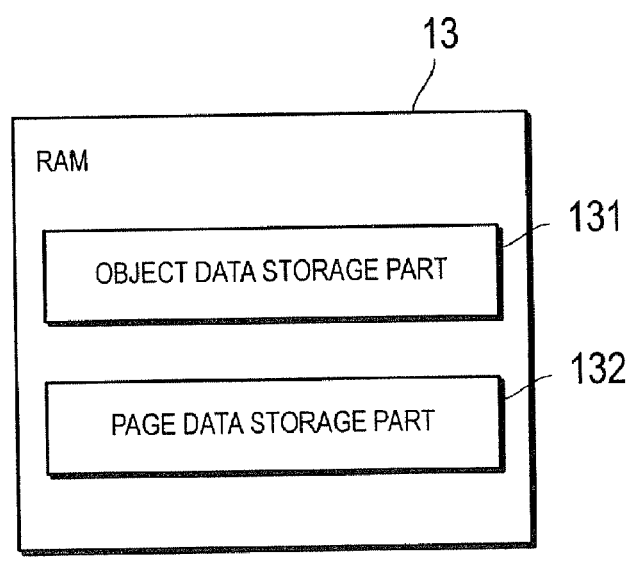
FIG. 8 is a diagram for describing an object data storage part and a page data storage part.

As shown in FIG. 8, the RAM 13 provides specific areas for an object data storage part 131 and a page data storage part 132 for their exclusive uses respectively. The object data storage part 131 stores the received RIP-executed object data. The page data storage part 132 stores the page data to be printed.

The operating panel unit 14 is used for displaying various kinds of information and for entering various instructions. The video interface 15 is an interface for communicating with the printer engine 17. The printer engine 17 prints the page data on a recording medium such as paper using a known imaging process such as the electronic photographing process including such processes as electrical charging, exposure, developing, transferring and fixing.

The printers 1 and 2, the client terminal 3, and the printer controller 4 may contain constitutional elements other than those described above, or may not include a portion of the above-mentioned elements.

The printing job in this embodiment is preferably a file of a format conforming to PPML (Personalized Print Markup Language). The printing job here is a file consisting of a layout file having the layout information of the objects of each page and a data file such as a PDF (Portable Document Format) file having a data group for each object, combined into one. The layout file contains information concerning the identification name and type of each object to be described later.

Figure 9:
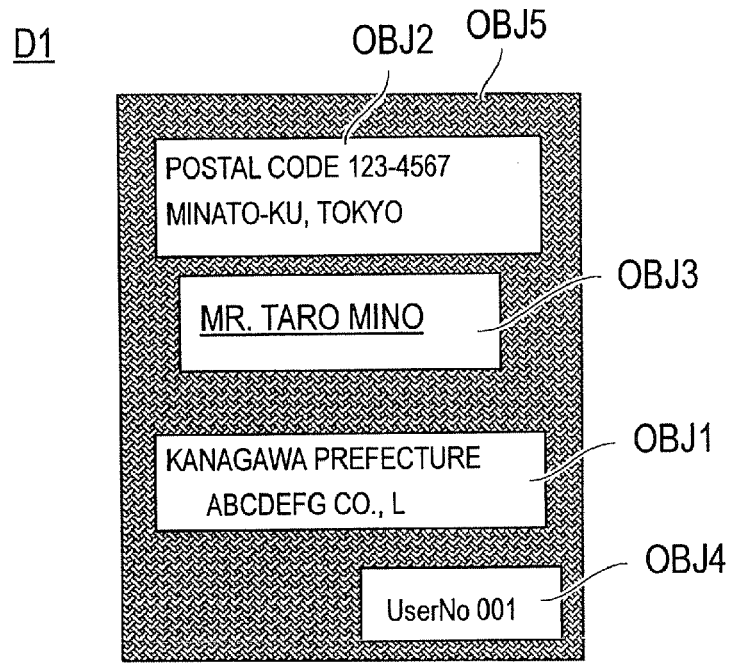
FIG. 9 through FIG. 14 are diagrams showing examples of input page data.
Figure 10:
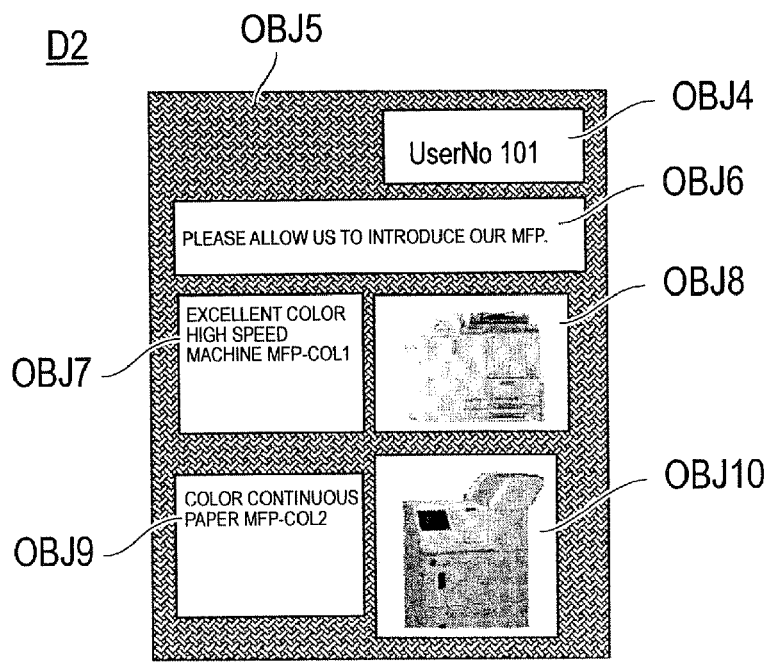
Figure 11:
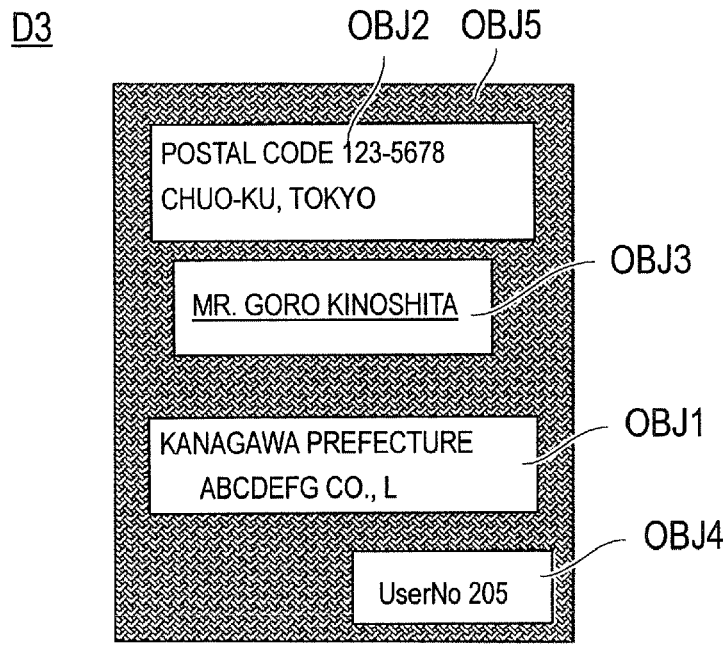
Figure 12:
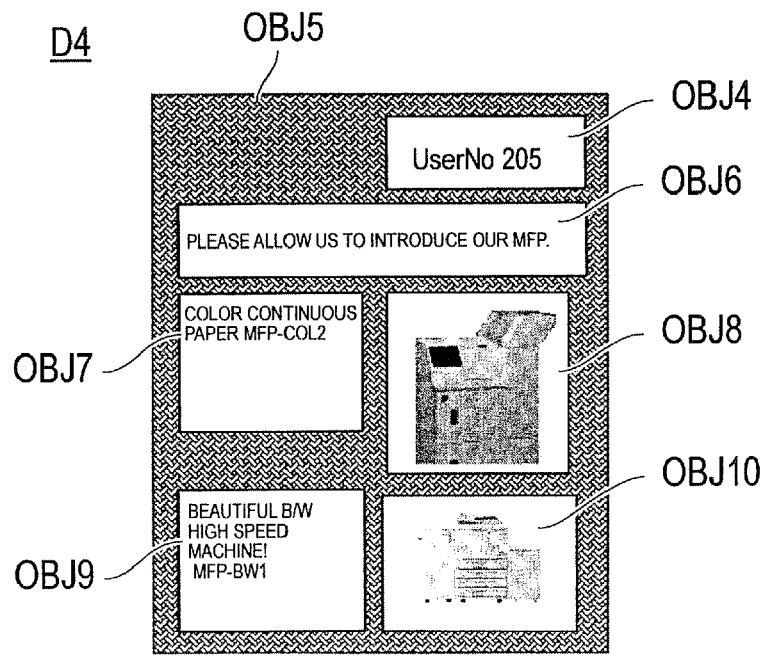
Figure 13:
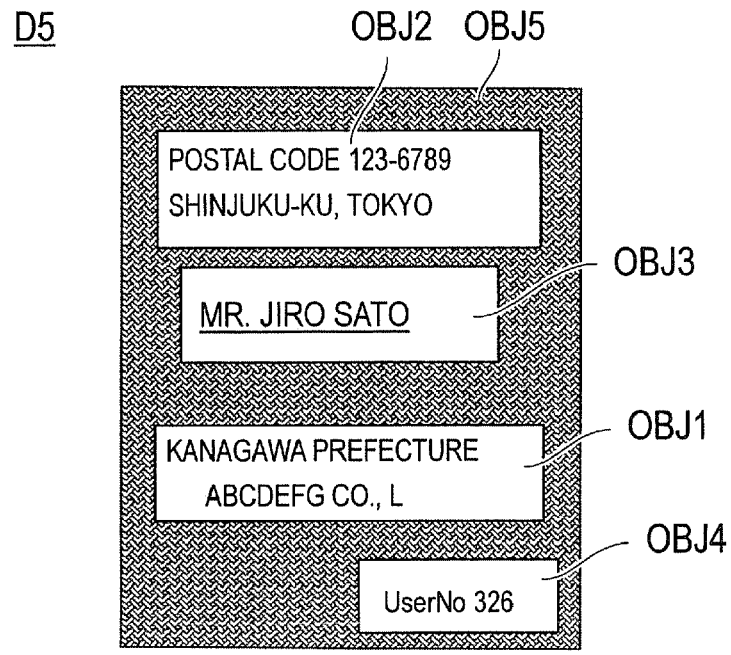
Figure 14:
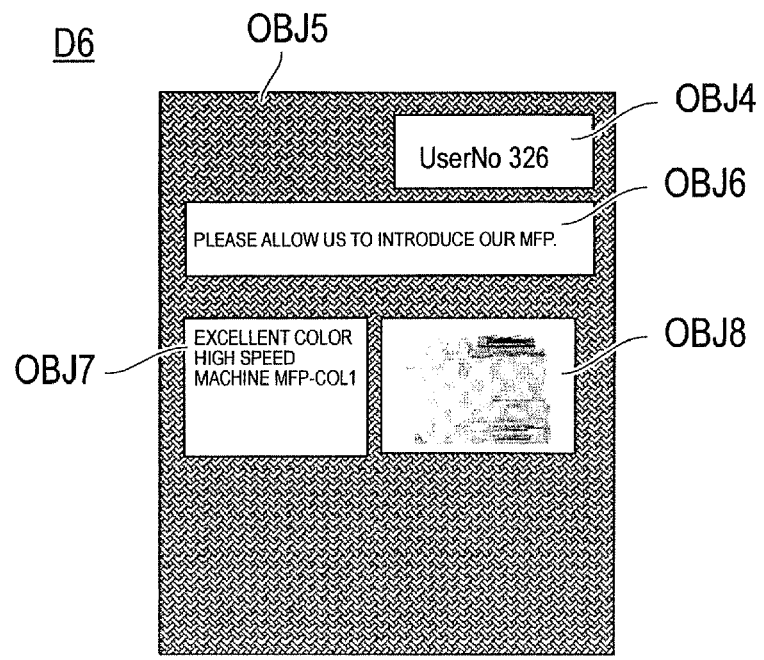

FIG. 9 through FIG. 14 are diagrams showing examples of input page data defined in the printing job. Input page data D1 through D6 here represent a total of six pages of data that correspond to double-sided direct mail for three persons. More specifically, FIG. 9 through FIG. 10 show front and back side data D1 and D2 of the direct mail for the first person, FIG. 11 through FIG. 12 show front and back side data D3 and D4 of the direct mail for the second person, while FIG. 13 and FIG. 14 show front and back side data D5 and D6 of the direct mail for the third person. In this embodiment, the page format for the direct mail data intended for one person consists of objects OBJ1 through OBJ10 as shown in these drawings.

A system will be described below which is based on a simple printing job distribution method, wherein the printer controller 4 transmits the input page data shown in FIG. 9 through FIG. 14 to two printers 1 and 2 reciprocally starting with the first page. In this case, the front surface of the double-sided direct mail is printed by the printer 1, while the back surface is printed by the printer 2. The two separate sheets printed on one side only are glued together in a separate process. Although it requires in reality adjustments such as synchronization between the front side printing and the back side printing, their descriptions are omitted here. However, it goes without saying that the printing job distribution method is arbitrarily changeable depending on the conditions such as the number of printers used and the constitution of the input page data.

Figure 15:
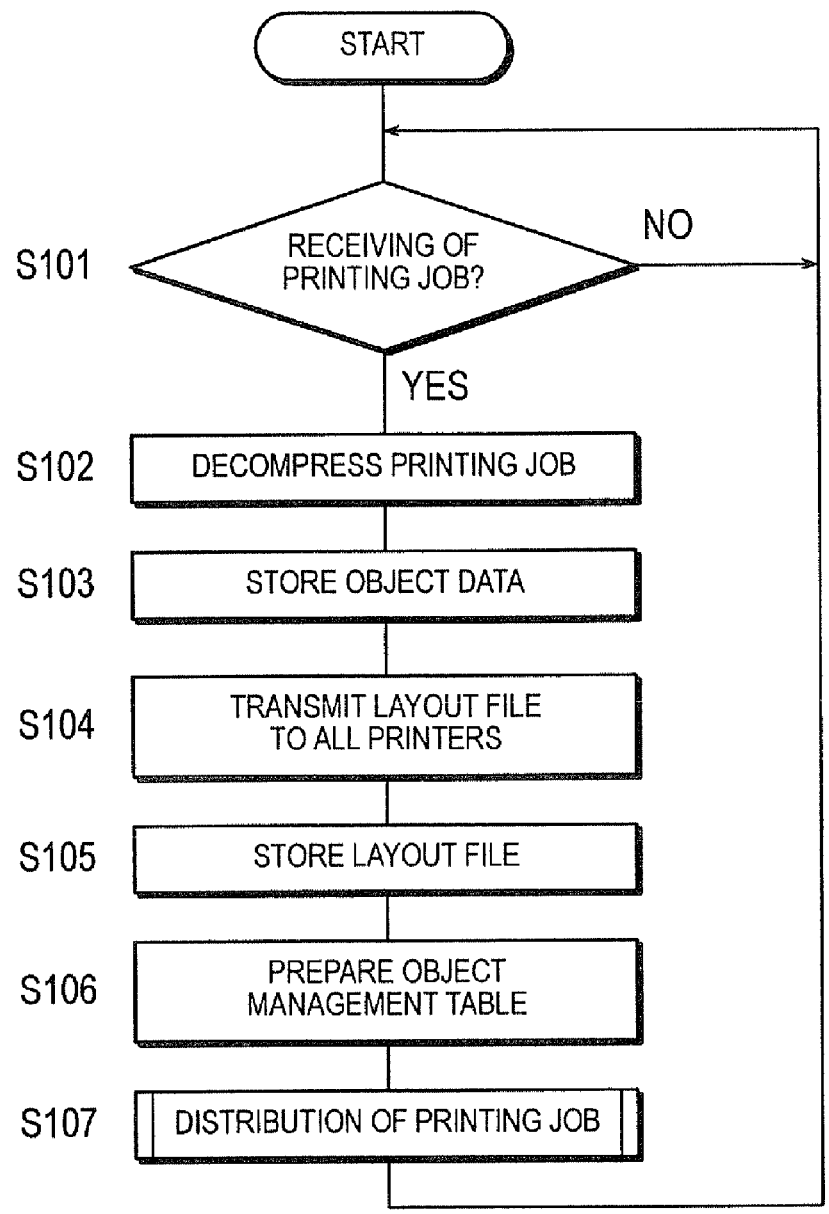
FIG. 15 is a flowchart showing the sequence of process of the distribution process unit of the printer controller.
Figure 16:
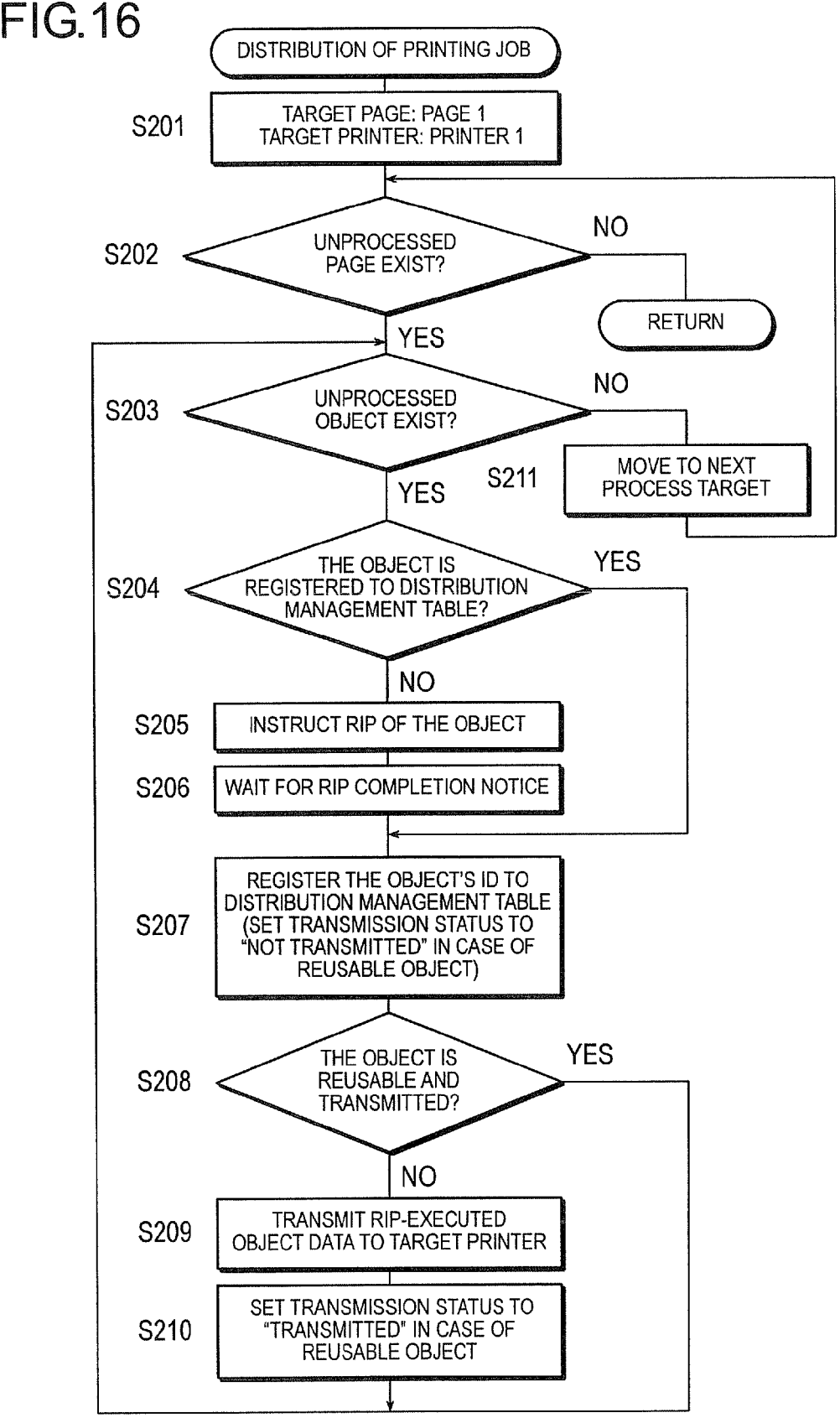
FIG. 16 is a flowchart showing the sequence of the printing job distribution process.

Next, the process of the distribution process unit 422 of the printer controller 4 will be described with reference to FIG. 15 through FIG. 18. The algorithm shown in the flowchart of FIG. 15 and FIG. 16 is stored as a program in a storage unit such as the ROM 42 of the printer controller 4 and executed by the CPU 41.

First, the printer controller 4 stands by until a printing job is received from the client terminal 3 (S101: No).

Upon receiving a printing job (S101: Yes), the printer controller 4 decompress the received printing job (S102), and stores the object data contained in the printing job into the object data storage part 431 of the RAM 43 (S103).

The printer controller 4 transmits a layout file contained in the printing job to all the printers 1 and 2 expected to be used (S104), and stores said layout file to a storage unit such as the hard disk 44 (S105).

Next, the object management table is prepared based on the received printing job (S106).

FIG. 17 is a diagram showing an example object management table. The object management table 432 shows how each of the input page data D1 through D6 consists of which of the objects OBJ1 through OBJ10. The identification names (e.g., "myadrs" and "adres1") of the objects that describe the contents corresponding to the objects OBJ1 through OBJ10 respectively are registered corresponding to the input page data D1 through D6. The items and types of the objects are registered with respect to the objects OBJ1 through OBJ10. The types of the objects indicate if each one is a reusable object or a temporary object. A reusable object is an object specified to be reusable in order to be used repetitively in a printing job, and a temporary object is an object to be used only once.

Next, the printing job distribution process is performed (S107). After the printing job distribution process is completed, it returns to the step S101. In the present printing job distribution process, the objects contained in the odd number pages (D1, D3, D5) are distributed to the printer 1, while the objects contained in the even number pages (D2, D4, D6) are distributed to the printer 2. The objects to be used commonly by the two printers 1 and 2 are distributed to both the printers 1 and 2. The object data already transmitted to the printers are managed and only the object data that have not yet been transmitted to each printer will be transmitted based on the management contents. In the following, more specific descriptions will be provided.

With reference to FIG. 16, the target page to be processed ("target page") is set up as the page 1 and the printer to which the target page is transmitted ("target printer") is set up as the printer 1 in the step S201.

Next, a judgment is made as to whether any unprocessed page exists or not among the printing job (S202).

If an unprocessed page exists (S202: Yes), a judgment is made as to whether any unprocessed object exists or not among target pages that are unprocessed pages (S203). At this time, the layout information of the target page is referenced. Since an unprocessed object exists initially (S203: Yes), the operation proceeds to a step 204 for processing said unprocessed object.

In the step S204, a judgment is made as to whether said unprocessed object is an object already registered in the distribution management table 433 or not.

FIG. 18 is a diagram showing an example distribution management table. The identification names of the objects to be used for each printer are registered in the distribution management table 433 (refer to the step S207). The identification name of an object is managed in accordance with the type indicating whether it indicates a reusable object or a temporary object, and a reusable object is managed in accordance with its transmission status whether it is already transmitted or not yet transmitted for each printer.

If said unprocessed object is not yet registered in the distribution management table 433 (S204: No), the RIP of said object is instructed to the RIP unit 421 (S205). The details of the RIP of the objects will be described later in detail. Upon receiving a notice that the RIP of the object is completed (S206), the operation advances to the step S207. On the other hand, if said unprocessed object is already registered in the distribution management table 433 (S204: Yes), the RIP instruction for said object is finished, so that the operation skips the RIP process for the object (S205 and S206) and advances to the step S207.

In the step S207, the identification name of the unprocessed object is registered to the distribution management table 433. Moreover, if the unprocessed object is a reusable object, the transmission state is set to "not transmitted." However, if the unprocessed object is already registered at the printer of the same transmission destination as that of the distribution management table 433, the process of this step is omitted.

Next, a judgment is made as to whether said unprocessed object is a reusable object and also has been transmitted or not (S208).

If said unprocessed object is a temporary object, or a reusable object and has not been transmitted (S208: No), object data obtained by applying RIP to said unprocessed object is transmitted to the target printer (S209). If it is a reusable object, the transmission state is set to "already transmitted" (S210), and returns to the step S203. On the other hand, if the unprocessed object is a reusable object and has been transmitted (S208: Yes), the operation skips the transmission process of the RIP-executed object data and returns to the step S203.

Also, if there is no object that has not been processed on the target page, which is an unprocessed page (S203: No), the operation moves to the next process target (S212) and returns to the step S202. In other words, the target page is set to the next page, and the target printer is set to the other printer of the printers 1 and 2.

On the other hand, if in the step S202 it is judged that there is no page that has not been processed in the printing job (S202: No), the operation returns to the flow chart of FIG. 15.

Next, the process of the RIP unit 421 of the printer controller 4 will be described below with reference to FIG. 19.

Figure 19:
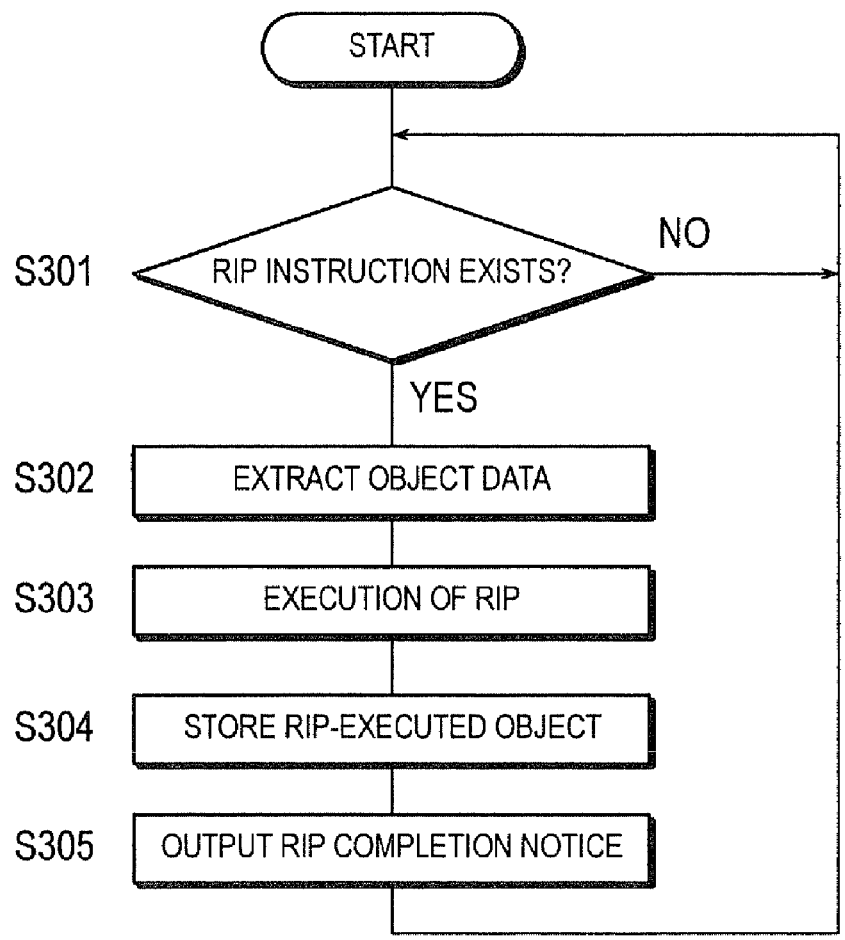
FIG. 19 is a flowchart showing the sequence of process of the RIP unit of the printer controller.

The algorithm shown in the flowcharts of FIG. 19 is stored as a program in a storage unit such as the ROM 42 of the printer controller 4 and executed by the CPU 41.

First, the RIP unit 421 of the printer controller 4 stands by until the RIP instruction for the object is received from the distribution process unit 422 (S301: No).

When an RIP instruction for the object is received (S301: Yes), the object data related to the instruction is extracted from the object data storage part 431 (S302), and the RIP is applied to the extracted object data (S303).

Next, the RIP-executed object data is stored into a storage unit such as the hard disk 44 (S304), and an RIP completion notice is issued to the distribution process unit 422 (S305).

Figure 20:
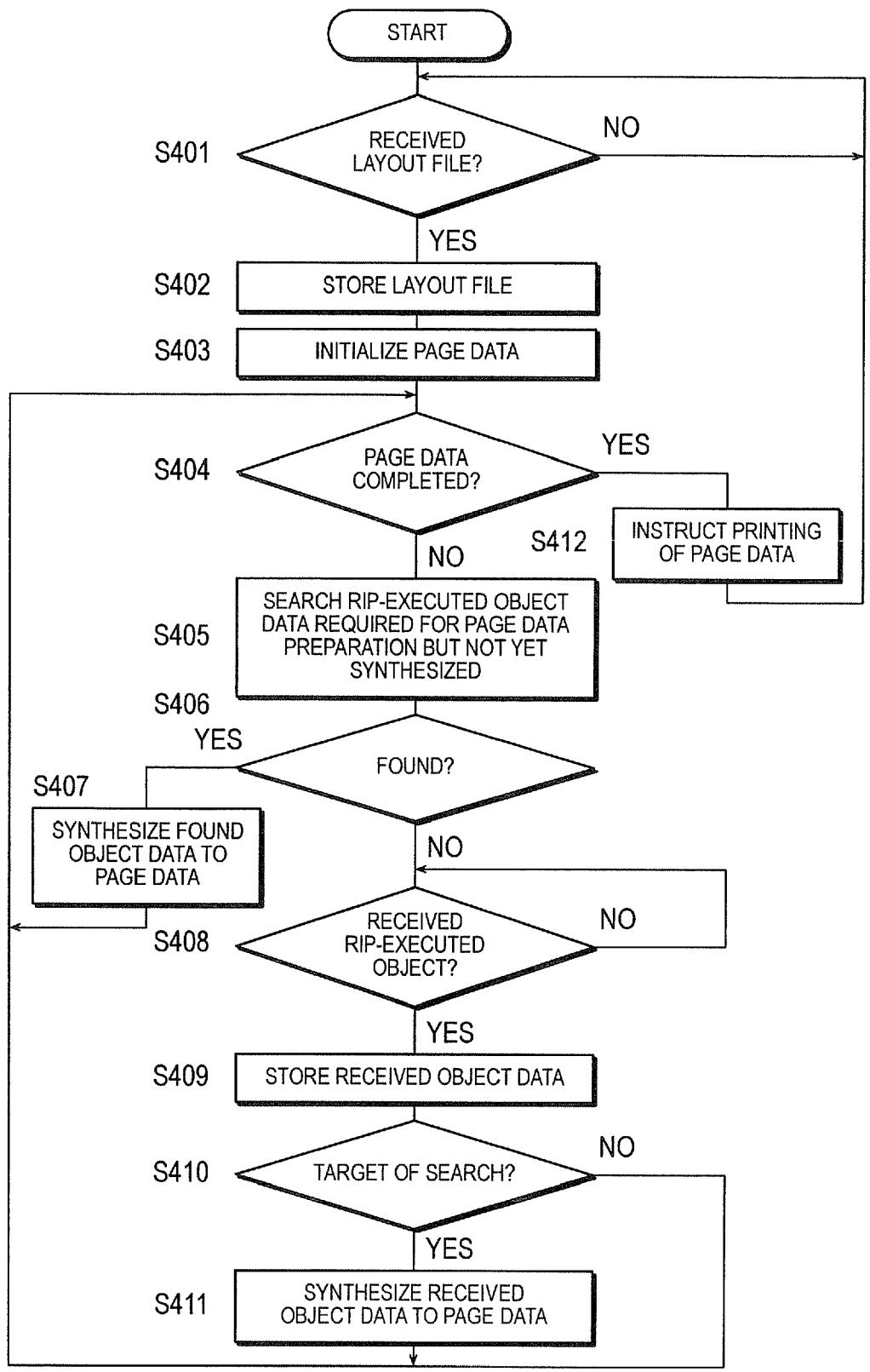
FIG. 20 is a flowchart showing the sequence of process of the synthesizing process unit of the printer.

Next, the process of the synthesizing process unit 121 of the printer 1 will be described below with reference to FIG. 20. The algorithm shown in the flowcharts of FIG. 20 is stored as a program in a storage unit such as the ROM 12 of the printer 1 and executed by the CPU 11. Since the process at the printer 2 is identical to that of the printer 1, its description is omitted (hereinafter the same).

Next, the printer 1 stands by until it receives the layout file from the printer controller 4 (S401: No).

Upon receiving the layout file (S401: Yes), the printer 1 stores the received layout file, for example, in the object data storage part 131 of the RAM 13 (S402).

Next, the page data to be used for printing is initialized (S403). The page data is stored in the page data storage part 132 of the RAM 13.

In the step S404, a judgment is made as to whether the page data is completed or not. Since the page data is not yet completed initially (S404: No), the operation advances to the step S405 in order to complete the page data.

In the step S405, object data required for the page data preparation, which has been RIP-executed but not yet synthesized to the page data, is searched in the object data storage part 131.

When the object data being searched is found (S406: Yes), the object data thus found is synthesized to the page data (S407), and the operation returns to the step S404.

If the object data being searched is not found (S406: No), the printer 1 stands by until an RIP-executed object data is received from the printer controller 4 (S408: No).

Upon receiving an RIP-executed object data (S408: Yes), the printer 1 stores the received object data in the object data storage part 131 of the RAM 13 (S409).

Next, a judgment is made as to whether the received object data is a target of the search in the step S405 (S410). If the received object data is the target of the search (S410: Yes), said object data is synthesized to the page data (S411), and the operation returns to the step S404. If the received object data is not a target of the search (S410: No), the operation returns straight to the step S404.

If it is judged that the page data is completed in the step S404 (S404: Yes), printing of the completed page data is instructed to the printing process unit 122 (S412), and the operation returns to the step S401. Although the printing instruction is normally issued when the entire page data is completed in the present embodiment, the printing instruction can be issued each time when data of each page is completed.

Figure 21:
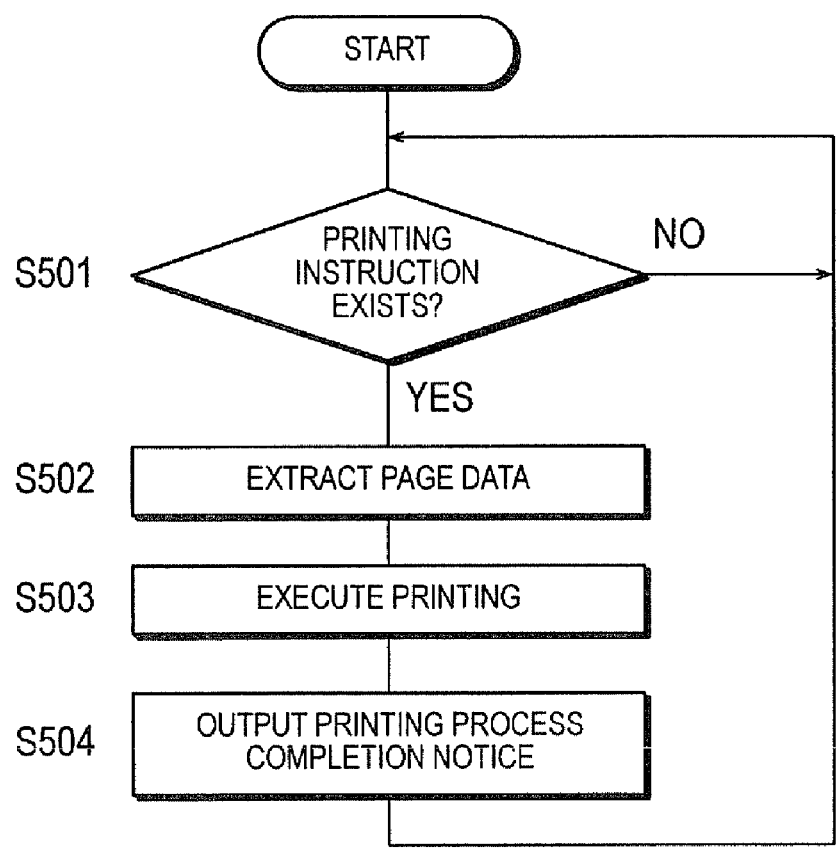
FIG. 21 is a flowchart showing the sequence of process of the printing process unit of the printer.

Next, the process of the printing process unit 122 of the printer 1 will be described below with reference to FIG. 21. The algorithm shown in the flowcharts of FIG. 21 is stored as a program in a storage unit such as the ROM 12 of the printer 1 and executed by the CPU 11.

The printing process unit 122 of the printer 1 stands by until a printing instruction for the page data is received from the synthesizing process unit 121 (S501: No).

If a printing instruction for the page data is received (S501: Yes), the page data related to the instruction is extracted from the page data storage part 132 (S502).

Next, printing is executed as the extracted page data is issued to the printer engine 17 (S503). When the page data printing is completed, the printing completion notice is issued, for example, to the client terminal 3 (S504).

As can be seen from the above, the already transmitted object data are managed for each printer of a plurality of printers, which are the destinations of the object data, and only the object data not yet transmitted will be transmitted for each printer to be synthesized at each of the plurality of printers in the present embodiment.

In other words, only those that need to be printed at each printer among the RIP-executed object data obtained by processing the printing job will be transmitted, no more or no less, to each printer. This makes it possible to improve the processing speed as a whole by minimizing the data transmission time to the printers as it prevents wasteful data transmission.

Therefore, it makes it possible to process a file containing objects for specifying pages, at least one of which objects being used in a plurality of locations in the file, and print the file at a high speed using a plurality of printers. In particular, it provides a remarkable effect in processing color image data with a large data quantity.

Next, an image processing system according to a second embodiment of the invention will be described below. Since the hardware constitution is identical to that of the image processing system of the first embodiment, the description is omitted. The following description of the image processing system according to the second embodiment therefore focuses on those points which are different from the first embodiment.

In the first embodiment, all the RIP-executed object data are transmitted from the printer controller to each printer. In the second embodiment, however, if there are any common object data that are to be used by a plurality of printers, the printer controller transmits the common object data to only a portion of printers (e.g., one printer), and the printer(s) that received the common object data transmit said common object data to other printers. That is the difference in the transmission method of the common object data to the printers between the first and second embodiments.

A system will be described below which is based on a simple printing job distribution method which is identical to the one used in the first embodiment, wherein the printer controller 4 transmits the input page data shown in FIG. 9 through FIG. 14 to two printers 1 and 2 reciprocally starting with the first page.

Next, the process of the distribution process unit 422 of the printer controller 4 in the second embodiment will be described with reference to FIG. 22 through FIG. 24. The algorithm shown in the flowchart of FIG. 22 and FIG. 23 is stored as a program in a storage unit such as the ROM 42 of the printer controller 4 and executed by the CPU 41.

Figure 22:
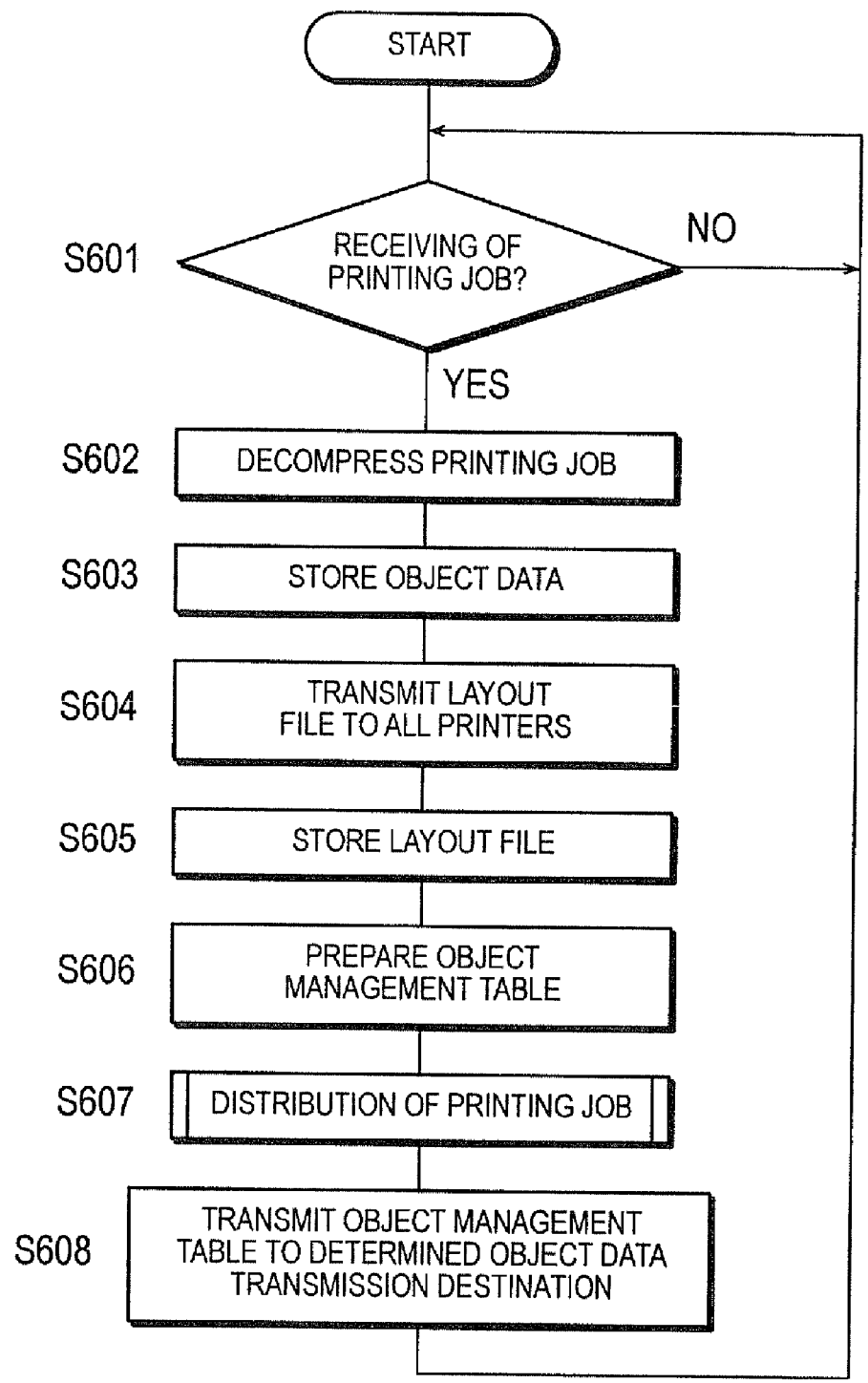
FIG. 22 is a flowchart showing the sequence of process of the distribution process unit of the printer controller according to a second embodiment of the invention.

Since the process of the steps S601 through S605 of FIG. 22 is the same as the process of the steps S101 through S105 of FIG. 15, the description is omitted.

An object management table is prepared in the step S606 based on the received printing job. As shown in FIG. 24, the object management table 432a prepared in the second embodiment contains the information of the transmission destination in addition to the contents of the object management table 432 prepared in the first embodiment. The printer controller 4 determines the transmission destination(s) of the common object data that are used common to a plurality of printers and stores the information of the transmission destinations in the object data storage part 432a. For example, the object management table 432a shown in FIG. 24 indicates that the object that describes the contents of the objects OBJ4 and OBJ5 is used commonly by both printers 1 and 2, but that the transmission destination of said object from the printer controller 4 is only the printer 1.

Next, the printing job distribution process is performed (S607). After the printing job distribution process is completed, it returns to the step S601. This printing job distribution process will be described later.

Next, the object management table 432a is transmitted to all the printers corresponding to the determined transmission destinations of the common object data (S608). The information transmitted to all the printers corresponding to the determined transmission destinations of the common object data is not limited to the format of the object management table 432a, but can be of any other management information concerning the common object data.

Next, the printing job distribution process according to the second embodiment will be described with respect to FIG. 23. Since the process of the steps S701 through S711 of FIG. 23 is the same as the process of the steps S201 through S211 of FIG. 16, the description is omitted.

If it is judged that the unprocessed object is already registered in the distribution management table 433 in the step S704 (S704: Yes), the operation advances to the step S712.

In the step S712, the identification name of the unprocessed object is registered to the distribution management table 433. Also, the transmission status of the unprocessed object is set up in the "already transmitted." Therefore, the common object data used in common to a plurality of printers is transmitted to only one printer in this embodiment. However, if the unprocessed object is already registered at the printer of the same transmission destination as that of the distribution management table 433, the process of this step is omitted.

The process of the RIP unit 421 of the printer controller 4 is identical to the process shown in FIG. 19, so that the description is omitted.

Next, the process of the synthesizing process unit 121 of the printer 1 according to the second embodiment will be described with reference to FIG. 25 and FIG. 26. The algorithm shown in the flowcharts of FIG. 25 and FIG. 26 is stored as a program in a storage unit such as the ROM 12 of the printer 1 and executed by the CPU 11.

Figure 25:
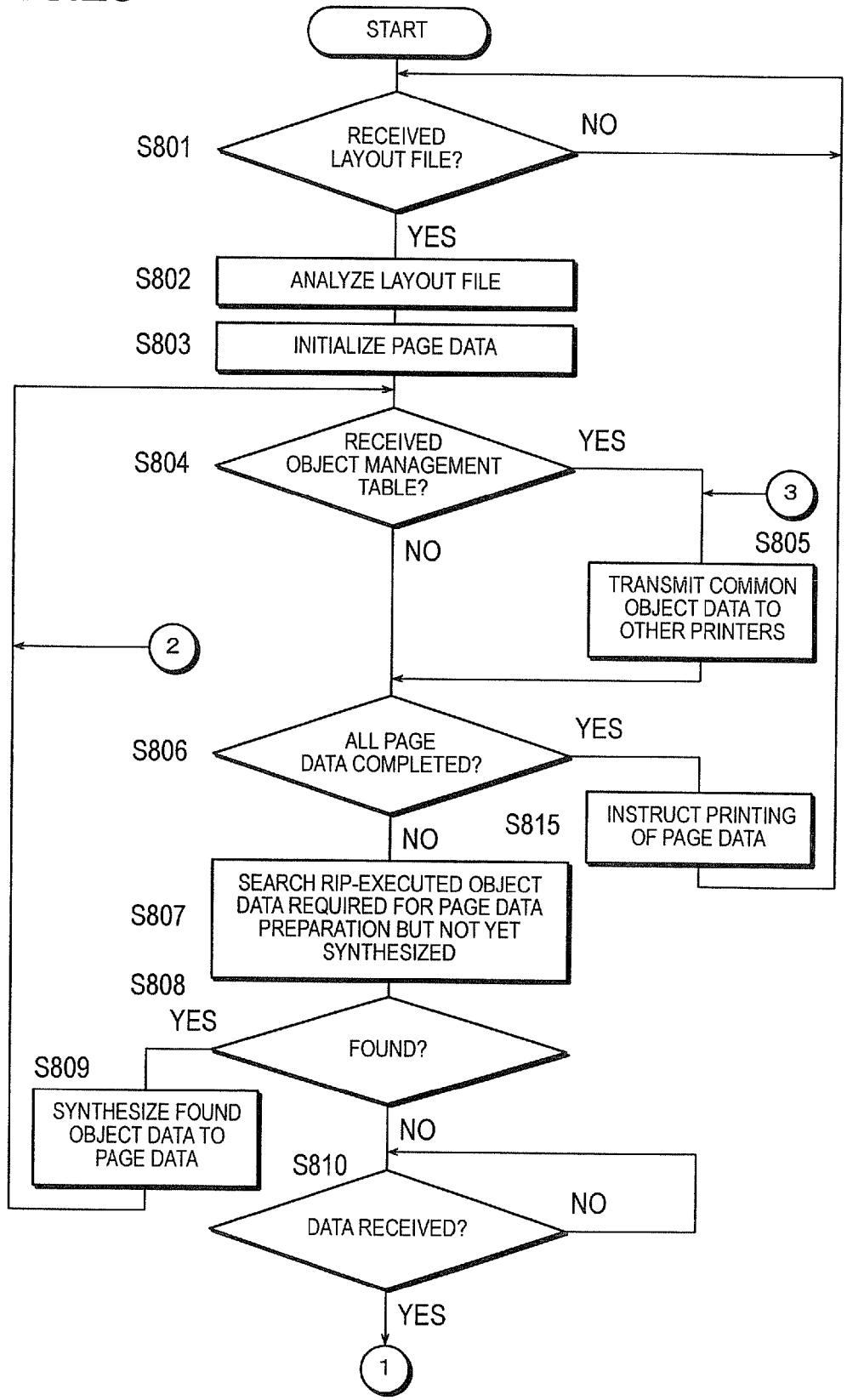
FIG. 25 is a flowchart showing the sequence of process of the synthesizing process unit of the printer according to the second embodiment.
Figure 26:
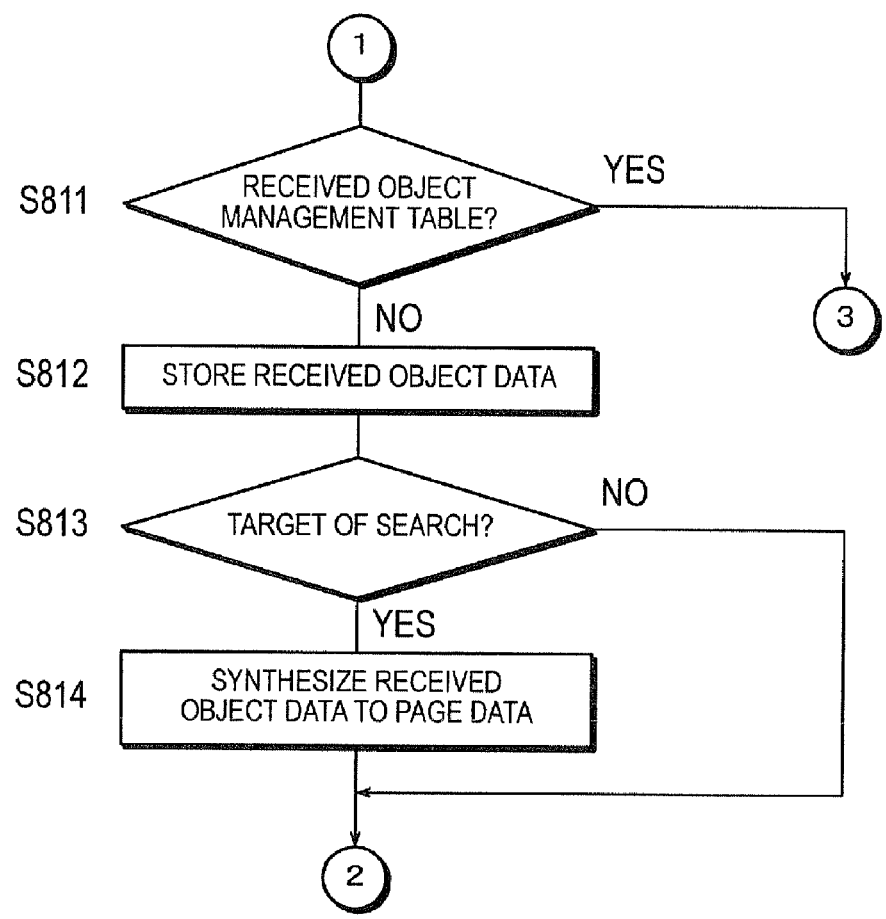
FIG. 26 is a flowchart continuing from FIG. 25 showing the sequence of process of the synthesizing process unit of the printer according to the second embodiment.

Since the process shown in the steps S801 through S803, S806 through S809, and S812 through S815 of FIG. 25 and FIG. 26 is the same as the process shown in the steps S401 through S407 and S409 through S412 of FIG. 20, the description is omitted.

In the step S804, a judgment is made as to whether the object management table 432a is received from the printer controller 4 or not (S804). If the object management table 432a is received (S804: Yes), the common object data is transferred to the printer 2, which is another printer, based on the contents of the object management table 432a (S805). Therefore, in this embodiment, the common object data is transmitted to the printer 2, not from the printer controller 4, but from the printer 1. On the other hand, if the object management table 432a is not received (S804: No), the operation advances to the step S806.

In the step S810, the printer 1 stands by until it receives data from the printer controller 4 or the other printer 2 (S408: No). The data here includes the RIP-executed object data from the printer controller 4 or the other printer 2, and the object management table 432a from the printer controller 4. If the object management table 432a is to be transferred from the printer controller 4 to the printer 2, the printer 1 receives the common object data from the printer 2.

In the step S811, a judgment is made as to whether the object management table 432a is received from the printer controller 4 or not. In other words, a judgment is made as to whether the data received in the step S810 is the object management table 432a or not. If the object management table 432a is received (S811: Yes), the operation advances to the step S805. This makes it possible to execute the process of transferring the common project data to other printers more speedily when the object management table 432a is received even during a page data synthesis. On the other hand, if the object management table 432a is not received (S811: No), in other words, if the data received in the step S810 is the RIP-executed object data, the operation advances to the step S812.

The process of the printing process unit 122 of the printer 1 is identical to the process shown in FIG. 21, so that the description is omitted.

In the second embodiment, as can be seen from the above, if there are any common object data that are to be used by a plurality of printers, the printer controller transmits the common object data to only one printer, and the printer that received the common object data transmit said common object data to other printers.

Therefore, the second embodiment can achieve not only a similar effect as the first embodiment, but also be able to lower the CPU load of the printer controller in the transmission of the object data by effectively using the CPU of the printer, thus improving the overall process efficiency.

It is obvious that this invention is not limited to the particular embodiments shown and described above but may be variously changed and modified without departing from the technical concept of this invention.

For example, it is also possible to use, in place of a printer, an image forming device such as a facsimile machine, a copying machine, or an MFP (multi-function peripheral) that has a combination of their functions.

The means and method of conducting various processes in the image processing system according to the present invention can be realized by means of a dedicated hardware circuit, or a programmed computer. Said program can be provided either by a computer readable recording medium such as a flexible disk and a CD-ROM, or by being supplied on-line via a network such as the Internet. In this case, the program recorded on the computer readable recording medium is normally transferred to and stored in a storage unit such as a hard disk. Said program can also be provided as independent application software or can be built into the software of the device as a part of its function.

What is claimed is:

1. An image processing device including a processor for processing a file containing objects that define a part or all of contents of a specific page, at least one of which objects is used in a plurality of locations in the file, comprising:
   a first management unit for managing object data for the objects contained in the file, and which object data has been transmitted to a first image forming device;
   a second management unit for managing object data for the objects contained in the file, and which object data has been transmitted to a second image forming device;
   a transmission control unit for controlling transmission of the object data to said first image forming device based on said first management unit's management contents of object data already transmitted to the first image forming device so that for each file being processed only the object data that has not yet been transmitted to said first image forming device will be transmitted to said first image forming device, and for controlling transmission of the object data to said second image forming device based on said second management unit's management contents of object data already transmitted to the second image forming device so that for each file being processed only the object data that has not yet been transmitted to said second image forming device will be transmitted to said second image forming device; and a transmitting unit for transmitting the object data in parallel to the first and second image forming devices.

2. An image processing device as claimed in claim 1, wherein
said file containing objects that define a part or all of contents of a specific page, at least one of which objects is used in a plurality of locations in the file is a PDF (Portable Document Format) file.

3. An image processing device as claimed in claim 1, wherein
said file containing objects that define a part or all of contents of a specific page, at least one of which objects is used in a plurality of locations in the file is a file of a format conforming to PPML (Personalized Print Markup Language).

4. An image processing device as claimed in claim 1, wherein
said file containing objects that define a part or all of contents of a specific page, at least one of which objects is used in a plurality of locations in the file is a PostScript® file.

5. The image processing device as claimed in claim 1, wherein objects of the file being transmitted to a plurality of image forming devices.

6. An image processing device as claimed in claim 1, wherein object data of an object used in a plurality of locations is managed in accordance with whether or not it has been transmitted to an image forming device.

7. An image processing method for processing a file containing objects that define a part or all of contents of a specific page, at least one of which objects is used in a plurality of locations in the file, comprising:
1) managing object data that has been transmitted to a first image forming device;
2) managing object data that has been transmitted to a second image forming device;
3) controlling transmission of the object data to said first image forming device based on management contents of object data already transmitted to the first image forming device in the step 1) so that for each file being processed only the object data that has not yet been transmitted to said first image forming device will be transmitted to said first image forming device, and controlling transmission of the object data to said second image forming device based on management contents of object data already transmitted to the second image forming device in the step 2) so that for each file being processed only the object data that has not yet been transmitted to said first image forming device will be transmitted to said first image forming device; and
4) transmitting the object data in parallel to the first and second image forming devices.

8. An image processing method as claimed in claim 7, wherein
said file containing objects that define a part or all of contents of a specific page, at least one of which objects is used in a plurality of locations in the file is a file of a format conforming to PPML (Personalized Print Markup Language).

9. The image processing method according to claim 7, further comprising transmitting objects of the file to a plurality of image forming devices.

10. A nontransitory computer readable recording medium stored with an image processing program for controlling an image processing device for processing a file containing objects that define a part or all of contents of a specific page, at least one of which objects is used in a plurality of locations in the file, said image processing program causing the image processing device to execute a process comprising the steps of:
1) managing object data that has been transmitted to a first image forming device;
2) managing object data that has been transmitted to a second image forming device;
3) controlling transmission of the object data to said first image forming device based on management contents of object data already transmitted to the first image forming device in the step 1) so that for each file being processed only the object data that has not yet been transmitted to said first image forming device will be transmitted to said first image forming device, and controlling transmission of the object data to said second image forming device based on management contents of object data already transmitted to the second image forming device in the step 2) so that for each file being processed only the object data that has not yet been transmitted to said first image forming device will be transmitted to said first image forming device; and
4) transmitting the object data in parallel to the first and second image forming devices.

11. A computer readable recording medium as claimed in claim 10, wherein
said file containing objects that define a part or all of contents of a specific page, at least one of which objects is used in a plurality of locations in the file is a file of a format conforming to PPML (Personalized Print Markup Language).

12. The computer readable medium as claimed in claim 10, further comprising transmitting objects of the file to a plurality of image forming devices.

13. An image processing system, comprising:
a first image forming device including a processor;
a second image forming device including a processor; and
an image processing device for processing a file containing objects that define a part or all of contents of a specific page, at least one of which objects is used in a plurality of locations in the file, and transmitting object data for each object in parallel to the first image forming device and the second image forming device;
said image processing device including:
a management information preparation unit for preparing management information concerning common object data to be used in common in the first image forming device and the second image forming device;
a first management unit for managing object data that has been transmitted to the first image forming device;
a second management unit for managing object data that has been transmitted to the second image forming device; and
a transmission control unit for controlling transmission of object data yet to be transmitted to said first image forming device based on said first management unit's management contents of object data already transmitted to the first image forming device as well as said management information, and transmission of object data yet to be transmitted to said second image forming device based on said second management unit's management contents of object data already transmitted to the second image forming device;

said second management unit managing common object data indicated in said management information as already transmitted;

said first image forming device including:

a transmission unit for transmitting common object data indicated in the management information received from said image processing device to said second image forming device; and a printing unit for printing based on the object data received from said image processing device;

said second image forming device including:

a printing unit for printing based on the object data received from said image processing device and said first image forming device.

14. An image processing system as claimed in claim 13, wherein said file containing objects that define a part or all of contents of a specific page, at least one of which objects is used in a plurality of locations in the file is a file of a format conforming to PPML (Personalized Print Markup Language).

15. The image processing system as claimed in claim 13, wherein objects of the file being transmitted to a plurality of image forming devices.

16. An image processing device used in an image processing system having a first image forming device, a second image forming device, comprising:

a management information preparation unit for preparing management information concerning common object data to be used in common in the first image forming device and the second image forming device;

a first management unit for managing object data that has been transmitted to the first image forming device;

a second management unit for managing object data that has been transmitted to the second image forming device; and a transmission control unit for controlling transmission of the object data to said first image forming device based on said first management unit's management contents of object data already transmitted to the first image forming device as well as said management information used for transmitting common object data indicated in said management information so that for each file being processed only the object data that has not yet been transmitted to said first image forming device will be transmitted to said first image forming device, and for controlling transmission of the object data to said second image forming device based on said second management unit's management contents of object data already transmitted to the second image forming device so that for each file being processed only the object data that has not yet been transmitted to said second image forming device will be transmitted to said second image forming device;

said second management unit managing common object data indicated in said management information as already transmitted; and a transmitting unit for transmitting the object data in parallel to the first and second image forming devices.

17. An image processing device as claimed in claim 16, wherein said file containing objects that define a part or all of contents of a specific page, at least one of which objects is used in a plurality of locations in the file is a file of a format conforming to PPML (Personalized Print Markup Language).

18. The image processing device as claimed in claim 16, wherein objects of the file are transmitted to a plurality of image forming devices.

19. An image forming device including a processor used in an image processing system having a plurality of image forming devices, and an image processing device for processing a file containing objects that define a part or all of content of a specific page, at least one of which objects is used in a plurality of locations in the file, the image forming device comprising:

a transmission unit for transmitting, when management information concerning common object data used commonly in the plurality of image forming devices is received from said image processing device, common object data indicated in the received management information to another image forming device; and a printing unit for printing based on the object data received from said image processing device and/or another image forming device.

20. An image forming device as claimed in claim 19, wherein said file containing objects that define a part or all of contents of a specific page, at least one of which objects is used in a plurality of locations in the file is a file of a format conforming to PPML (Personalized Print Markup Language).

21. The image forming device as claimed in claim 19, wherein said image forming device prints objects of the file, and another image forming device prints objects of the file.

* * * * *